Dec. 10, 1957  C. A. ROSEN  2,816,236
METHOD OF AND MEANS FOR DETECTING STRESS PATTERNS
Filed June 19, 1956
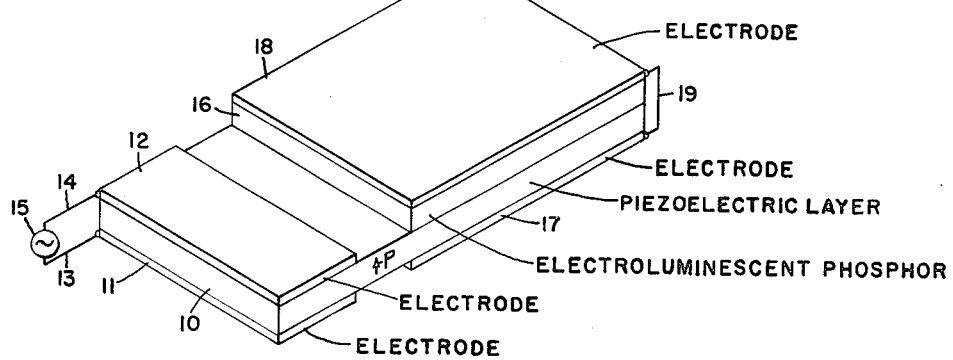
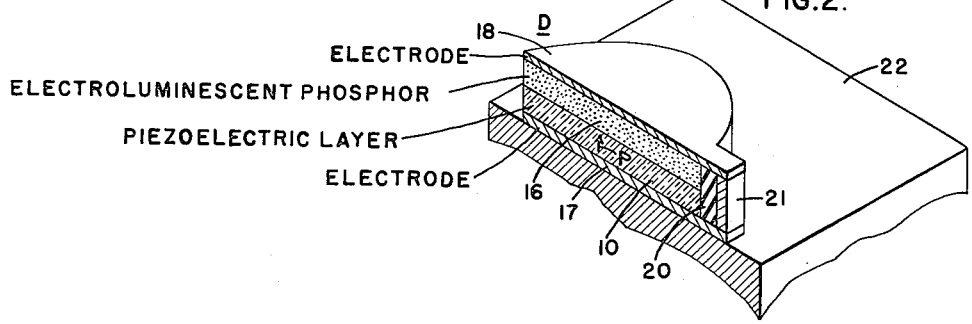
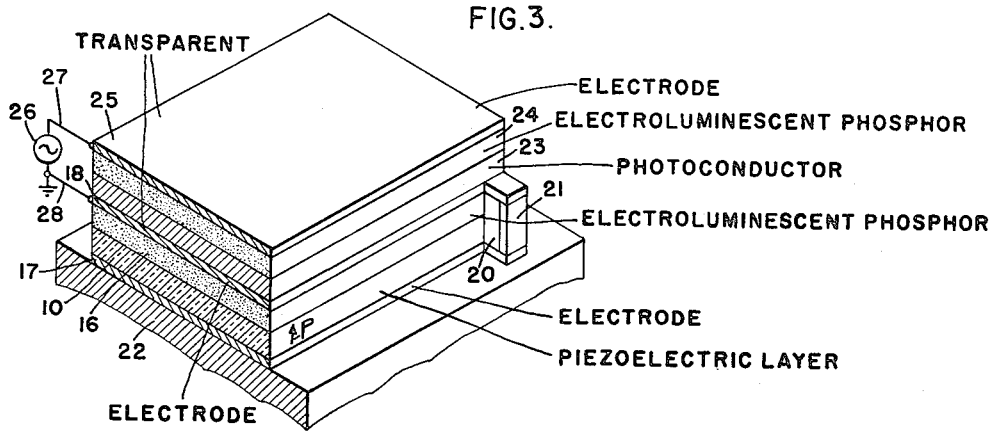
INVENTOR:
CHARLES A. ROSEN,
BY Robert J. Steinmeyer
HIS ATTORNEY United States Patent Office 2,816,236
Patented Dec. 10, 1957

2,816,236

METHOD OF AND MEANS FOR DETECTING STRESS PATTERNS

Charles A. Rosen, East Syracuse, N. Y., assignor to General Electric Company, a corporation of New York Application June 19, 1956, Serial No. 592,360

9 Claims. (Cl. 250—213)

This invention relates to a method and a means for detecting and measuring acoustic stress patterns. More particularly, the invention relates to an acoustic-optical transducing device comprising an electroluminescent phosphor bonded to a piezoelectric material for immediately and directly rendering acoustic stress patterns visible.

The phenomenon of electroluminescence, upon which the present invention in part depends, is the process by which certain semi-conducting materials, known as phosphors, emit radiant energy at room temperature under the primary stimulus of an electrical potential or an electric field. Such phosphors include, for example, gallium phosphide and zinc sulfide activated with copper. While the radiant energy emitted by such phosphors shall for the sake of clarity herein be referred to as "light," for the the purposes of this specification it is to be understood that the term "light" refers to all radiation emitted by electroluminescent phosphors and includes invisible as well as visible radiation. While there are several scientific theories presently advanced to explain the mechanism by which electroluminescence occurs, a discussion of these theories is not essential herein. For a further survey of the subject of electroluminescence, reference is hereby made to an article entitled, "Electroluminescence and related topics," by Destriau and Ivey, in volume 43, No. 12, December 1955, "Proceedings of the Institute of Radio Engineers," page 1911.

A piezoelectric material, on the other hand, may be defined as one which exhibits the phenomenon of expansion along one axis and contraction along another axis when subjected to an electric field and which also exhibits the converse phenomenon of producing opposite charges on opposed surfaces of the material when an acoustic stress is set up in the material. For the purposes of this application, the term "acoustic stress" means a stress reulting from any material vibration whether created by mechanical, acoustic, electrical, or other external forces. Such piezoelectric materials may be either single crystals such as quartz, Rochelle salt, or ammonium dihydrogen phosphate (hereafter called ADP), or they may be polycrystalline materials such as ferroelectric ceramics which have been polarized. Such ferroelectrics include for example, lead zirconate, barium titanate and lead meta-niobate. For a further survey of such polarizable ferroelectrics, reference is made to an article by Shirane, Jona, and Pepinsky entitled "Some aspects of ferroelectricity" in volume 43, No. 12, December 1955, "Proceedings of the Institute of Radio Engineers," page 1738.

Such piezoelectric materials may be used to construct electromechanical filters or transducers in accordance with the teaching of the copending patent application Serial Number 439,992, filed June 29, 1954, by Charles A. Rosen, Keith A. Fish, and Herbert C. Rothenberg, entitled, "Electromechanical Transducer" and assigned to the same assignee as the present application. Briefly, the aforesaid application discloses a piezoelectric transformer comprising a resonant piezoelectric body upon which input and output electrodes are applied. By appropriate physical design of the transformer, substantial transformation ratios may be achieved at frequencies of excitation corresponding to a resonant mode of vibration of the body. The device also has filtering properties due to its frequency dependent response. In the design of such filters a piezoelectric material is shaped to a particular pre-selected geometry and an acoustic stress pattern is set up therein. These acoustic stress patterns will in general represent solutions to the general elasticity equations wherein the boundary conditions are determined by the geometry and constraints of the material and the constants of the equation depend upon the nature and crystal structure of the particular material used. The details of this mathematical analysis are not necessary to an understanding of the present invention. However, for a more complete discussion of the general elasticity equations, reference is made to the book entitled, "The Theory of Sound," by Lord Rayleigh, volume 1, chapter 10, published by Dover Publications, New York, 1945.

In filter applications it is usually desired to determine the frequency or band of frequencies at which a resonant mode of vibration exists for a particular geometrical configuration of a given material. Conversely, one may wish to know how the wave distribution at a particular frequency of excitation is varied by changes in geometry of the filter. In a resonant mode of vibration of a rectangular plate, for example, a standing wave distribution of the displacement, stress and strain is set up along the length and breadth of the plate. These complex modes of vibration are difficult to analyze even for relatively simple geometries, and it would be desirable to have a simple means of directly observing the geometrical distribution of the areas of maximum stress therein.

Furthermore, the problem is not restricted to the design of electromechanical filters. A similar problem exists in the more general field of vibration or stress analysis. Various types of dynamic strain gauges have in the past been devised to deal with this problem, but none have succeeded in making stress patterns directly visible.

It is therefore an object of this invention to provide a method of detecting and measuring acoustic stress patterns.

It is a further object of this invention to provide a device comprising a piezoelectric material and an electroluminescent phosphor which is adapted to render acoustic stress patterns directly visible.

It is a further object of this invention to provide such a device which is adapted for use with a light amplifier for detecting relatively weak mechanical or acoustic vibrations.

Briefly stated, in accordance with one aspect of my invention, an electroluminescent phosphor is bonded to a piece of piezoelectric material. The composite is embraced by a common electrode having at least that portion which contacts the electroluminescent phosphor light-transmitting. Voltage patterns produced at the interface of the two materials through the piezoelectric conversion of mechanical energy in acoustic stress patterns immediately excite the electroluminescent phosphor and give a visible image which is a function of the stress pattern in the piezoelectric material.

While the novel and distinctive features of the invention are particularly pointed out in the appended claims, a more expository treatment of the invention, in principle and detail, together with additional objects and advantages thereof, is afforded by the following description and accompanying drawings of representative embodiments in which like reference characters are used to indicate like parts throughout and wherein:

Figure 1 is a perspective view, drawn to an exaggerated scale, of one embodiment of my invention particularly adapted for use in the design of electromechanical filters.

Figure 2 is a perspective view, partly broken away, of another embodiment of my invention, adapted for general use in vibration analysis.

Figure 3 is a perspective view, partly broken away, of another embodiment of my invention including a light amplifier.

Turning now to Figure 1 there is shown a piezoelectric plate 10 which may consist of any of the known piezoelectric materials noted above such as quartz, Rochelle salt, ADP, or any of the ferroelectric ceramics which have been polarized. These ferroelectric ceramics include, for example, lead zirconate, barium titanate, and lead metaniobate. The process of polarizing a ferroelectric ceramic in order to render it piezoelectric consists of heating the ceramic beyond its ferroelectric Curie temperature, applying a relatively large uni-directional electric field to the material, and allowing the material to cool back to room temperature while the field is still applied. For barium titanate, for example, the ferroelectric Curie temperature is approximately 120° C. and the applied polarizing field should be between 8 and 15 thousand volts per inch. It will, of course, be understood that for materials which are naturally piezoelectric, this polarizing process is not necessary.

Attached to piezoelectric plate 10 are a pair of driving electrodes, 11 and 12, which may conveniently consist of silver paint or paste or any other electrical conductor applied in any convenient manner to a minor portion, that is, to less than half of the surface area of plate 10. Conductors 13 and 14 are attached to electrodes 11 and 12 respectively and are connected to a source of electrical power 15. Source 15 may conveniently be a variable frequency, variable voltage alternating current power supply. The electric field applied to one end of plate 10 by source 15 will cause the entire plate to vibrate mechanically in accordance with the above-noted piezoelectric effect. It should be noted that source 15 and electrodes 11 and 12 are merely one convenient means of causing plate 10 to vibrate and that any other direct or indirect mechanical, acoustic, electrical, or electromechanical means could also be used in conjunction with any suitable means for supporting or constraining plate 10.

A layer 16 comprising an electroluminescent phosphor is applied to at least half of the area of one surface of the plate 10. A light transmitting electrode 18 is applied to electroluminescent layer 16. Electroluminescent layer 16 preferably consists of a thin layer of gallium phosphide which may be caused to emit radiation under the excitation of small applied voltages of the order of 5 or 10 volts. This layer may, for example, be evaporated in vacuo onto piezoelectric layer 10. Alternatively, electroluminescent layer 16 may consist of a thin film of a transparent plastic dielectric such as nitrocellulose having embedded therein a dispersed mass of microcrystalline particles of any known electroluminescent phosphor, such as gallium phosphide or zinc sulfide activated with about 0.3% by weight of copper. As a further alternative layer 16 may be a continuous, homogeneous crystalline phosphor prepared by the vapor reaction technique taught by U. S. Patent No. 2,675,331 to Cusano and Studer. As yet another alternative, layer 16 may comprise a plurality of properly oriented single crystals of phosphor material as taught by U. S. Patent No. 2,721,950 to Piper and Johnson.

Electrode 18 which is applied to electroluminescent layer 16, is preferably transparent and may comprise a vitreous material on which is sprayed or otherwise deposited layers of tin chloride, known to the art as "conducting glass." Electrode 18 is, however, preferably a conducting layer of titanium dioxide which may be prepared and rendered conductive in accordance with the teachings of U. S. Patent No. 2,717,844 to L. R. Koller. Electrode 17 which is applied to the opposite surface of plate 10 may be opaque, in which case it may conveniently comprise a thin evaporated, sputtered, or sprayed layer of a conducting metal such as silver, or aluminum, or may be any other convenient form of electrode structure. Electrodes 17 and 18, however, should preferably be substantially coextensive over a portion of the area of plate 10. Electrodes 17 and 18 are joined together or short circuited as by a conductor 19, for example, so that in effect they form one continuous electrode.

The operation of the device of Figure 1 may be understood as follows. The electric field applied between electrodes 11 and 12 by source 15 causes plate 10 to vibrate due to the conversion of electrical to mechanical energy in accordance with the piezoelectric effect. This vibration is transmitted to the entire plate and sets up a stress pattern therein in accordance with the above noted elasticity equations. The stress pattern results in a separation of electrical charge between the major surfaces of plate 10 in the direction of polarization indicated by the arrow P in accordance with the conversion of mechanical to electrical energy by the piezoelectric effect. The amount of charge separation will differ at various points or local areas throughout the piezoelectric material in accordance with the amount of stress at the particular point or local area and will consequently result in a correspondingly varying voltage pattern being set up at the interface of piezoelectric slab 10 and electroluminescent layer 16. Since the surface resistivities of the electroluminescent phosphor and the piezoelectric material are quite high, charge density can vary with position and retain its local magnitude for an appreciable period of time without equalizing over the whole surface.

The voltage pattern at the interface of plate 10 and electroluminescent phosphor 16 creates an electric field across the phosphor and thus immediately excites it, thereby giving a visual image corresponding to the acoustic stress pattern in plate 10. Since the brightness of light output of an electroluminescent phosphor is a function of the magnitude of the voltage applied to it, it will depend at each point on the local charge density and will represent visually the degree of stress at each point. Of course, for a directly readable and truly quantitative representation of the degree of stress, a linear portion of the brightness versus applied voltage characteristic of the electroluminescent phosphor must be used. Alternatively, any suitable detector such as a light meter may be calibrated to take into account the previously measured characteristics of the electroluminescent phosphor so that the meter may be made to read directly the voltage appearing across piezoelectric layer 10. In many applications, however, one is primarily interested in observing or measuring the geometrical distribution of the points of maximum stress in a resonant mode of vibration of plate 10. In such a resonant mode of vibration, a standing wave distribution of displacement, stress and strain is set up simultaneously along the length and breadth of plate 10. It has been found readily possible to locate the points of maximum stress in such a distribution by noting the points of maximum brightness of emission from electroluminescent phosphor 16 either by simple visual observation or by detection with any radiation sensitive device such as a camera. Thus, as the frequency of driving source 15 is varied one may determine what the resulting stress patterns are at each frequency and at what frequencies a resonant mode of vibration for any particular geometry of plate 10 exists. Complex modes of vibration which are difficult to analyze even for relatively simple geometries can thus be examined easily.

It should also be noted that any arbitrary pattern, whether of the standing wave type or of the type made up of progressive acoustic waves, will be made visible.

Thus, if plate 10 is mechanically tapped while constrained, or is driven, for example, by an electromechanical transducer coupled mechanically to it, rather than by source 15 and electrodes 11 and 12, it is possible to present visual information varying in time by modulating the stress patterns through the agency of the electromechanical transducer. In general one need observe the stress pattern in only half of plate 10 if a symmetrical plate is used since the symmetry will result in similar patterns in both halves.

It will be understood however that the shape of the acoustic-optical transducer may be varied and that it may be used in applications other than the design of electromechanical filters. In Figure 2, for example, there is shown a similar device used as a vibration detector or dynamic strain gauge. The thin piezoelectric plate 10 is here shown as a disk polarized in the direction of the arrow P perpendicular to its major surfaces. Deposited on plate 10 is the electroluminescent layer 16 which may also be of the same material as the layer 16 in Figure 1. Deposited on layer 16 in turn is the transparent electrode 18, while the opposite surface of layer 10 is provided with the electrode 17. Electrodes 17 and 18 are joined by a conducting member 21 which is separated from layers 10 and 16 by an insulating member 20. Of course conductor 21 could also be simply an insulated wire similar to conductor 19.

Electrode 17 which supports the transducer is cemented or otherwise attached to any body 22 in which one desires to detect vibrations occuring in a longitudinal direction parallel to the plane of the cemented bond which acts as a constraint on the piezoelectric material. Body 22 could, for example, be a steel beam stressed under any desired applied load. A plurality of these transducers of any desired shape or size which may be adapted to fit the contour of any particular body may be attached to the surface of such a vibrating body. The direction of polarization of the piezoelectric material should, however, be perpendicular to the surface of the vibrating body in order to apply an electric field across the electroluminescent phosphor. Piezoelectric material 10 is caused to vibrate by the vibration of the surface of body 22 to which the transducer is attached. As in the operation of the device of Figure 1 explained above, the brightness of the radiation emitted by electroluminescent phosphor 16 will provide an indication of the degree of stress in piezoelectric material 10 and hence of the stress at any desired point on body 22. One particular advantage of the device of the present invention over known dynamic strain gauges is the ease and accuracy with which it will detect high frequency vibrations which may for example, be in the ultrasonic frequency range.

If these vibrations are relatively small so that it is difficult to detect the radiation from electroluminescent layer 16, a light amplifier of any convenient type may be added to the transducer of Figure 2 in the manner illustrated by way of example in Figure 3. In Figure 3 corresponding reference characters again indicate the parts of the device previously described. The acoustic-optical transducer is here shown as being rectangular and again cemented or otherwise attached to a vibrating body 22. Electroluminescent phosphor layer 16 is preferably gallium phosphide or any other phosphor the radiant emission spectrum of which peaks in or near the red wave lengths. Deposited on transparent electrode 18 is a layer 23 of a photoconducting material. Photoconducting layer 23 may be of any material the electrical resistance or impedance of which varies as a function of radiant energy incident thereon from electroluminescent layer 16. Such materials include, for example, the sulfides, selenides, and tellurides of zinc, cadmium, and lead. Preferably, however, layer 23 should consist of cadmium selenide, the photoconductive response of which also peaks in or near the red wave lengths of the spectrum and which will therefore be most sensitive to the radiation emitted from the gallium phosphide layer 16. Photoconductive layer 23 may be deposited upon electrode 18 by spraying, evaporating, or any other known technique. Of course, the use of a gallium phosphide phosphor in conjunction with a cadmium selenide photoconductor is merely one example of approximately matching the peak of the spectral distribution of the emission of the phosphor to the peak of the spectral response of the photoconductor. Other specific materials having a similar relationship could obviously be used.

It should also be understood that, if desired, photoconductor 23 could be deposited upon a transparent electrode (not shown) separated from electrode 18 by a transparent insulator. That is to say, electrode 18 may be, but need not necessarily be, common to the acoustic-optical transducer and the light amplifier.

Deposited upon photoconductive layer 23 is a second layer 24 of electroluminescent phosphor. Layer 24 may consist of any of the known electroluminescent phosphors as outlined above for layer 16. Preferably, however, the phosphor used for layer 24 should be zinc sulfide activated by 0.3% by weight of copper or any other electroluminescent phosphor having an emission spectrum which peaks at or near the green wave lengths. This mismatch of the spectral response of electroluminescent layer 24 and photoconductive layer 23 will tend to minimize the effects of light feedback from layer 24 to layer 23 which, depending upon circuit operating conditions, may otherwise result in enough regeneration to impair the linearity of response of the overall device to the vibrations of body 22. Deposited upon layer 24 is another layer 25 which is a second transparent electrode similar to electrode 18.

Electrode 18 is connected by conductor 28 to the grounded side of a source of electrical power 26, the other side of which is connected by conductor 27, to electrode 25. The source of power 26 thus applies an electrical field across electroluminescent layer 24 and photoconductive layer 23 which are in electrical series relation with power source 26 and hence act as a voltage divider. When electroluminescent layer 16 is excited by the electric field across it resulting from longitudinal vibrations of the body 22 which are transmitted to piezoelectric material 10, the radiant emission from layer 16 impinges upon photoconductive layer 23, the resistance of which will vary from point to point in accordance with the intensity of this radiation locally incident upon it. As the resistance of photoconductive layer 23 decreases with increasing intensity of radiation from layer 16, more of the voltage applied from source 26 will appear across electroluminescent layer 24. The intensity of radiation emitted by electroluminescent layer 24 will therefore be increased. Inasmuch as the power causing this increased radiation is drawn from an independent source 26 and is merely controlled by the radiation from electroluminescent layer 16, it is apparent that by suitable choice of the thickness and electrical characteristics of layers 23 and 24 and of the magnitude of source 26, the intensity of the radiation emitted from electroluminescent layer 24 may be caused to be many times the intensity of the radiation emitted from electroluminescent layer 16. Furthermore, due to the relatively high surface resistivities at the interface between photoconductive layer 23 and electroluminescent layer 24 the pattern of light output from layer 24 may be caused to reproduce the pattern of light output from layer 16 which in turn represents the stress pattern in the body 22.

It will, of course, be understood that the composite acoustic-optical transducer and light-amplifier device shown in Figure 3 is intended for the detection of small mechanical vibrations or acoustic stress patterns which may not be readily made visible by the transducer of Figure 2. If desired, additional light-amplifier stages could be added. Furthermore, the size and shape as well as the means of supporting and stressing either of the devices of Figures 2 or 3 may be adapted to the needs of any particular application.

While the principles of the invention have now been made clear in illustrative embodiments, there will be immediately obvious to those skilled in the art many modifications in structure, arrangement, proportions, the elements and components used in the practice of the invention, and otherwise, which are particularly adapted for specific environments and operating requirements, without departing from those principles. The appended claims are, therefore, intended to cover and embrace any such modifications, within the limits only of the true spirit and scope of the invention.

What I claim as new and desire to secure by Letters Patent of the United States is:

1. The method of detecting and measuring acoustic stress patterns comprising establishing a voltage pattern at the surface of a body of piezoelectric material by generating mechanical vibration thereof, exciting an electroluminescent phosphor by applying thereto said voltage pattern, and measuring the acoustic stress pattern in said piezoelectric material by determining the intensity of radiation emitted by said phosphor in response to the application of said stress pattern.

2. The method of detecting and measuring acoustic stress patterns comprising the steps of, establishing an acoustic stress pattern in a piezoelectric material to produce a voltage pattern at the surface thereof, exciting an electroluminescent phosphor by the voltage appearing across said stressed piezoelectric material, and observing the intensity of radiation emitted by said phosphor as a measure of the stress in said piezoelectric material.

3. The method of detecting and measuring acoustic stress patterns comprising the steps of, establishing an acoustic stress pattern in a piezoelectric material to produce a voltage pattern at the surface thereof, exciting an electroluminescent phosphor by the voltage appearing across said stressed piezoelectric material, amplifying the radiation emitted by said electroluminescent phosphor, and observing the intensity of said amplified radiation as a measure of the stress in said piezoelectric material.

4. The method of detecting vibrations comprising the steps of, transmitting said vibrations to a piezoelectric material thus establishing an acoustic stress pattern in said piezoelectric material, exciting an electroluminescent phosphor by the voltage appearing across said stressed piezoelectric material, and observing the intensity of radiation emitted by said phosphor.

5. An article of manufacture comprising, a first layer comprising a piezoelectric material, a second layer comprising an electroluminescent phosphor, said first and second layers being in contact with each other at a common interface, and an electrically common electrode in contact with both said first and second layers at points remote from said interface, at least a portion of said electrode in contact with said second layer being transparent to the radiation emitted by said electroluminescent phosphor.

6. An article of manufacture comprising, a first layer comprising an electrically-conducting material, a second layer comprising a piezoelectric material deposited upon and in extended area contact with said first layer, a third layer comprising an electroluminescent phosphor deposited upon and in extended area contact with said second layer, a fourth layer comprising an electrically-conductive light-transmitting material, and electrical conductor means connecting said first and said fourth layers together to form a common electrode.

7. An article of manufacture comprising a first layer comprising an electrically conducting material, a second layer comprising a piezoelectric material deposited upon and in extended area contact with said first layer, a third layer comprising an electroluminescent phosphor deposited upon and in extended area contact with said second layer, a fourth layer comprising an electrically-conducting light-transmitting material, electrical conductor means connecting said first and said fourth layers together to form a common electrode, a fifth layer comprising a photoconductor deposited upon and in extended area contact with said fourth layer, a sixth layer comprising an electroluminescent phosphor deposited upon and in extended area contact with said fifth layer, a seventh layer comprising an electrically-conducting light-transmitting material deposited upon and in extended area contact with said sixth layer, and means to apply an electrical potential between said fourth and said seventh layers.

8. Apparatus as in claim 7 wherein the photoconductor of said fifth layer consists of a material having a spectral response peak at substantially the same wavelength as the peak of the spectral emission of the material selected for the electroluminescent phosphor of said third layer and wherein the electroluminescent phosphor of said sixth layer consists of a material having a spectral emission peak at a substantially different wavelength than the material selected for the photoconductor of said fifth layer.

9. Apparatus as in claim 7 wherein said electroluminescent phosphor of said third layer is gallium phosphide, said photoconductor of said fifth layer is cadmium selenide, and said electroluminescent phosphor of said sixth layer is zinc sulfide activated with copper.

References Cited in the file of this patent
UNITED STATES PATENTS 2,508,098    Chilowsky              May 16, 1950

FOREIGN PATENTS 157,101    Australia               June 16, 1954